United States Patent [19]

Mery

[11] Patent Number: 4,588,051
[45] Date of Patent: May 13, 1986

[54] DISC BRAKE

[75] Inventor: Jean-Claude Mery, Pavillons sous Bois, France

[73] Assignee: Societe Anonyme D.B.A., Paris, France

[21] Appl. No.: 560,649

[22] Filed: Dec. 12, 1983

[30] Foreign Application Priority Data

Dec. 23, 1982 [FR] France .............................. 82-21687

[51] Int. Cl.[4] ..................... F16D 55/224; F16D 69/04
[52] U.S. Cl. ................................ 188/73.32; 188/73.44;
188/250 B
[58] Field of Search ............... 188/73.44, 73.34, 73.33,
188/73.32, 73.35, 73.36, 73.37, 73.38, 73.39,
73.41, 73.43, 73.45, 73.47, 205, 71.1, 72.4, 72.5,
73.1

[56] References Cited

U.S. PATENT DOCUMENTS

| | | | |
|---|---|---|---|
| 3,942,611 | 3/1976 | Burnett | 188/73.3 |
| 4,004,658 | 1/1977 | Margetts et al. | 188/73.5 |
| 4,209,083 | 6/1980 | Gerard | 188/73.6 |
| 4,473,137 | 9/1984 | Gerard et al. | 188/73.32 |

FOREIGN PATENT DOCUMENTS

| | | |
|---|---|---|
| 1390337 | 1/1965 | France . |
| 2272298 | 12/1975 | France . |
| 2409423 | 6/1979 | France . |
| 2488962 | 2/1982 | France . |

Primary Examiner—Douglas C. Butler
Attorney, Agent, or Firm—Larry J. Palguta; Ken C. Decker

[57] ABSTRACT

The subject of the invention is a disc brake of the type with a caliper (1) mounted to slide on a fixed support (4) by a column (3). The caliper (1) incorporates a brake motor (9) acting directly on an inner pad and via the caliper (1) on an outer pad. The two pads are received so as to slide in an orifice (5) formed in the caliper (1). The pads are locked in the orifice by a key (20). According to the invention, the inner pad incorporates a semi-circular lug (25) mounted in a semi-circular receptacle (24) formed in the fixed support (4) so as to prevent the caliper (1) from tilting about the column (3) when the pads are in place and are locked by the key (20). The invention may be utilized with the brakes of motor vehicles.

3 Claims, 4 Drawing Figures

DISC BRAKE

The present invention relates to a disc brake comprising a caliper which is mounted to slide parallel to the axis of the brake disc on a fixed support secured to a frame, two friction pads located in said caliper on either side of the disc and mounted to slide parallel to the said axis, a rectangular assembly orifice delimited by two guide edges, parallel to the axis of said disc, and provided in the caliper to allow the passage of the active part of the friction pads, each lining-holder plate of which has a bearing nose opposite the corresponding guide edge, a transverse key capable of being introduced between a guide edge of the caliper and the corresponding bearing nose of the two plates to prevent any untimely radial movement of the pads, and a control motor mounted on the inner part of the caliper and capable of stressing the inner pad in the direction of the outer pad which bears against the caliper head.

A disc brake of this type is known from French Pat. No. 77 34537 (2,409,423). In this disc brake, the caliper is mounted on two columns. Consequently, it is necessary to ensure that the guide bores provided on the caliper and receiving the free part of the columns, which are mounted on the fixed support by means of their other end, are perfectly parallel to one another.

It is also known to mount the caliper on the fixed support by means of a single column (see, for example, French Pat. No. 81 15 946 - publication no. 2,488,962). In this case, the lining-holder plates of the two pads are mounted in the fixed support so as to be capable of being displaced parallel to the axis of the brake disc and so as to transmit the braking torque directly by means of their front face onto the bearing faces provided for this purpose on the fixed support, the active part of which must consequently be located downstream of the caliper, in the direction of rotation of the disc, and must straddle the brake disc. This gives rise to a risk of twisting and a lack of parallel alignment which results in unequal wear of the brake linings. To prevent untimely tilting of the caliper, the latter is locked in rotation by means of a screw engaged in a thread provided in the lining-holder plate of the outer pad. Although, in principle, no force is applied to the connecting screw between the outer pad and the caliper, it happens fairly often that the screw is deformed and prevents the connection between the caliper and the pads from being broken and, as a result, the tilting of the caliper about the axis of the column and therefore the rapid replacement of the pads.

The object of the present invention is to eliminate the disadvantages mentioned above and to provide a brake disc of the type mentioned initially, which, despite the assembly of the caliper on a single column, is compact and ensures transmission of the braking torque to the fixed support both directly and by means of the caliper while guaranteeing the caliper a tilting lock which can be eliminated as required and without difficulty.

Starting from a disc brake of the type mentioned initially, this object is achieved due to the fact that, in a way known per se, the caliper is mounted on the fixed support by means of a single column parallel to the axis of the brake disc, that the lining-holder plate of the inner pad incorporates, under the guide edge remote from the column, a semicircular pivoting lug and, under the guide edge adjacent to said column, a curved contour located within a circle, the radius of which is equal to the distance between the pivot axis of said lug and the lower bearing ridge of said adjacent guide edge, and that the fixed support has, underneath the guide edge remote from the column, a semicylindrical locking receptacle, the axis of which is parallel to the axis of the brake disc and which is open towards the guide edge adjacent to the column and is capable of receiving said pivoting lug, the transverse key being engaged above said locking receptacle between the corresponding guide edge and the bearing noses of the two brake pads.

By means of this design, the inner pad is braced both against the locking receptacle of the fixed support and against the guide edge adjacent to the column and thus prevents the caliper from pivoting about the column, but, as soon as the key is brought into its unlocking position, the caliper can be tilted slightly so that the lower flank of the guide edge adjacent to the column moves slightly away from the lower flank of the corresponding bearing nose of the lining-holder plate of the inner block. Consequently, the lock as a result of the bracing of the inner pad between the fixed support and the caliper is eliminated, and the inner pad can be pivoted about the axis of the locking receptacle, for example in an anti-clockwise direction, and after the lug has been drawn out of its receptacle and, if appropriate, after the inner pad has been drawn out of the caliper, the caliper can be pivoted about the column in the opposite direction, that is to say, for example, in a clockwise direction.

The subject of the invention will be understood even better by means of the following description of an embodiment illustrated in the attached drawings in which.

Figure 2:
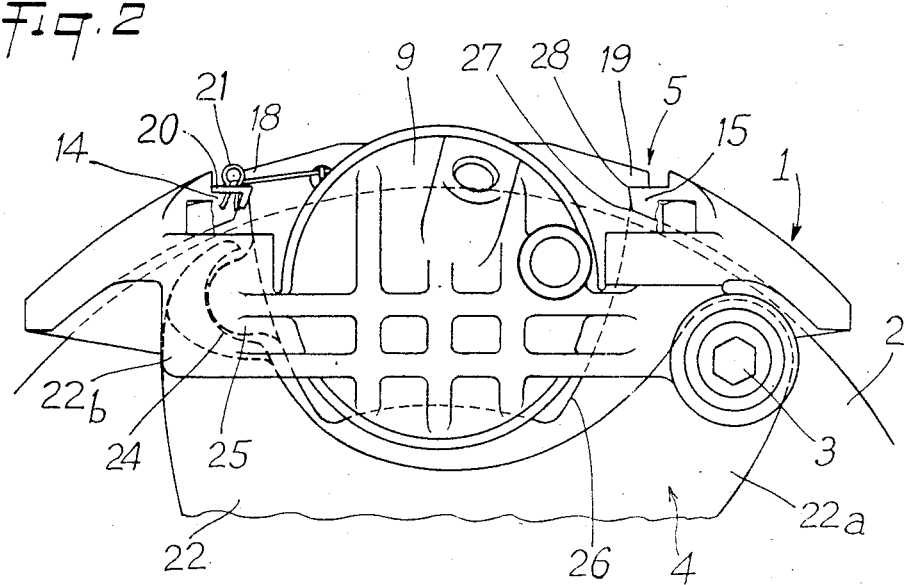
FIG. 2 is an elevation view of the inside of the disc brake according to the arrow II of FIGS. 1 and 4.
Figure 1:
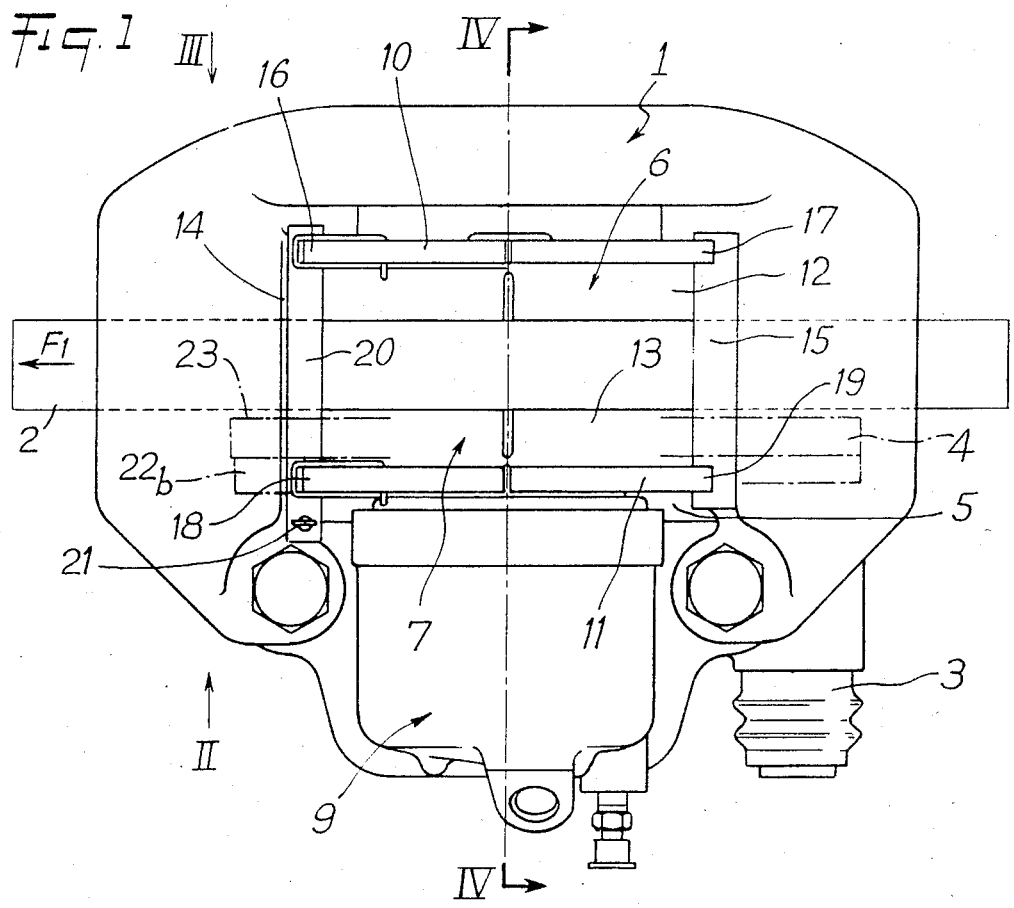
FIG. 1 is a plan view of the disc brake.
Figure 3:
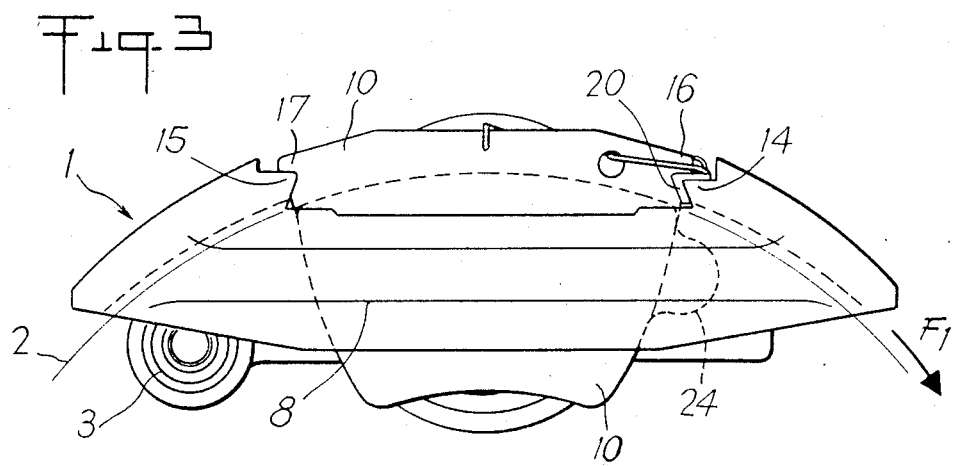
FIG. 3 is an elevation view of the outside of the disc brake according to the arrow III of FIGS. 1 and 4.
Figure 4:
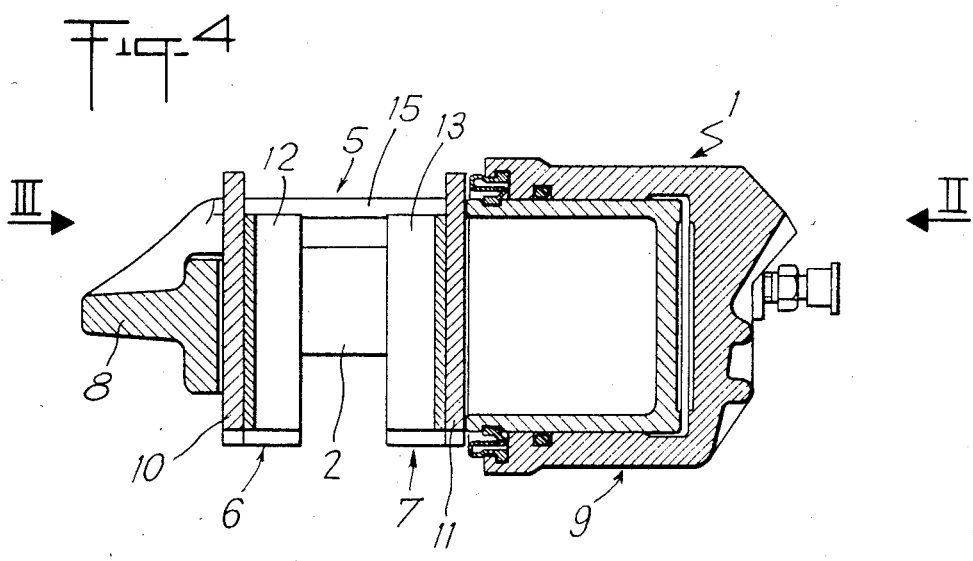
FIG. 4 is an elevation view of a radial section through the disc brake along the line IV—IV of FIG. 1.

The disc brake according to the invention comprises a caliper 1 which caps by means of its two lateral branches a brake disc 2 which is rotatable about an axle (not shown). At one of its ends, that is to say the rear end, in the direction of rotation F1 of the disc corresponding to forward movement, the caliper 1 is mounted by means of a column 3 on a fixed support 4 secured to a frame, so as to be capable of sliding on said column 3 parallel to the axis of the disc 2. The caliper 1 incorporates a peripheral assembly orifice 5 which is of rectangular shape and which is provided in the caliper 1 to allow the passage of the active part of the friction pads 6 and 7. The pad 6 which bears on the caliper head 8 is called the outer pad and the pad 7 interacting directly with the control motor 9 incorporated in the caliper 1 is called the inner pad. Each pad 6,7 comprises a lining-holder plate 10,11 made of a suitable metal and a brake lining 12,13 applied to one of the side faces of the brake disc 2.

The front and rear sides of the passage orifice 5 of the caliper 1 are delimited respectively by a guide edge 14,15 which extends parallel to the axis of the brake disc 2 and which interacts with one of the two bearing noses 16,17 or 18,19 of the lining-holder plate 10 or 11 of the outer pad 6 or inner pad 7. Each guide edge takes the form of a straight rib, the cross-section of which has a V-shape and the upper flank of which is located in a plane parallel to a plane tangent to the brake disc 2.

In a similar way, each bearing nose 16,17,18 and 19 has a straight groove, the cross-section of which is likewise in the form of a V and the upper flank of which is located likewise in a plane also parallel to the same tangent plane mentioned above. Underneath the bearing noses 16,17 or 18,19, each lining-holder plate 10,11 narrows progressively in a curved form in the direction of the axis of the brake disc 2, so that the maximum width of each lining-holder plate 10 and 11 immediately below the bearing noses is less than the distance separating the upper ridges 28 of the two guide edges 14 and 15 by a value equal to the thickness of a locking key 20, the cross-section of which likewise has a V shape and which is interposed between a guide edge, for example 14, and the corresponding bearing noses, for example 16 and 18, of the lining-holder plates 10 and 11. By means of this locking key which is introduced in a direction parallel to the guide edges 14 or 15 to fill the gap existing between the said guide edge and the corresponding bearing noses, opposite bearing noses are applied against the guide edge 15, and since the lower flanks of each guide edge 14,15 and of each corresponding bearing nose 16,18 and 17 are inclined towards one another so as to narrow the passage orifice 5 towards the outside, looking in a radial direction, the lining-holder plates 10 and 11 remain locked on the lower flanks of the key and of the guide edges 14 and 15 against any radial displacement, while being capable of displacement parallel to the axis of the brake disc 2. Since the structure of these guide edges 14 and 15, of the bearing noses 16 to 19 and of the transverse locking tab 20 is substantially known from French Pat. No. 77 34537 (2,409,423), there is no need to describe it here in any more detail. The safety pin 21 engaging into an end hole in the key 20 makes it possible to secure said key 20 against any untimely transverse displacement as a result of coming up against either the corresponding guide edge, for example 14, or the adjacent screw head.

It would easily be understood that the pads 6 and 7 can be introduced radially into the caliper 1 via the passage orifice 5 or can be removed radially from the said caliper when the key 20 is withdrawn or placed in an inactive unlocking position.

At the level of the caliper 1, the fixed support 4 is made in the form of a notched plate 22 so as to surround the lower part of the inner pad 7 by means of two end horns 22a and 22b, the outer face 23 of said plate extending parallel to the brake disc 2 in the vicinity of the latter. The column 3 is fastened to the rear horn 22a of the fixed support 4 underneath one of the guide edges, for example 15, of the caliper 1 and as near as possible to the periphery of the brake disc 2. Underneath the other guide edge, for example 14, the front horn 22b of the fixed support 4 penetrates into the caliper 1 up to a point located underneath the guide edge 14 and incorporates a semicylindrical locking receptacle 24, the axis of which is parallel to the axis of the brake disc 2 and which is open towards the guide edge 15 adjacent to the column 3. Opposite this semicylindrical locking receptacle 24, the lining-holder plate 11 of the inner pad 7 incorporates a semicylindrical pivoting lug 25, the radius of curvature of which is slightly less than that of the locking receptacle 24 and some of the periphery of which is applied against the bottom of the locking receptacle 24, a certain radial play existing at the two ends of the said receptacle 24 between the inner face of this receptacle and the corresponding part of the periphery of the pivoting lug 25. As can be seen in FIG. 2, the pivoting lug 25 bears in the bottom of the locking receptacle 24, while the bearing nose 19 associated with the guide edge 15 adjacent to the column 3 is applied against the said guide edge 15. It will therefore be understood easily that the fixed support 4 receives directly the braking torque applied to the inner pad 7 and prevents any untimely tilting of the caliper 1 about the column 3 because the bearing of the lining-holder plate 11 of the inner pad 7 in the bottom of the locking receptacle 24 of the fixed support 4, on the one hand, and on the guide edge 15 of the caliper 1, on the other hand, constitutes a sort of locking connection by means of bracing.

As mentioned above, the front face 26 of the lining-holder plate 11 of the inner pad 7, this front face following the oblique lower flank of the bearing nose 19, has the curved shape of a partial cylinder and is located within an imaginary cylinder, the radius of which is equal to the distance between the center of pivoting of the lug 25 and the lower ridge 27 of the lower flank of the bearing edge 15. The distance between the axis or center of pivoting of the lug 25 and the upper ridge 28 of the guide edge 15, this upper ridge 28 being defined by the joining of the two lateral flanks of the guide edge 15, is slightly less than the distance separating the center or axis of pivoting of the lug 25 and the lower edge 27 of said guide edge 15. It follows from this that the lining-holder plate 11 of the inner pad 7 is locked against any tilting upwards about the axis or center of pivoting of the lug 25. However, when the locking key 20 is placed in one of its inactive positions, the end of the caliper 1, located on the same side as the horn 22b of the fixed support 4, can be raised slightly so that the caliper and consequently the upper ridge 28 of the guide edge 15 tilt slightly about the axis of the column 3 in a clockwise direction, moving away from the path of tilting of the lining-holder plate 11 about the pivot axis of the pivoting lug 25, this pivoting taking place in an anti-clockwise direction. The inner lining 7 can then be removed from the caliper 1 along an oblique path.

The outer pad 6 is, of course, assembled or removed in a radial direction, as in the case known from French Pat. No. 2,409,423.

The friction pads 6 and 7 are replaced in the following way:

Starting from the position indicated in the drawing, the key 20 is first placed in an inactive position allowing the outer pad 6 to be removed radially. Subsequently, the key 20 is placed in an inactive position for the inner block 7, so that the caliper 1 can be tilted slightly upwards about the column 3. At this moment, the connection as a result of the bracing of the lining-holder plate 11 of the inner pad 7 between the locking receptacle 24 and the guide edge 15 adjacent to the column 3 is broken, and the inner pad 7 can be tilted about the pivot axis of the lug 25 in an anti-clockwise direction. The caliper 1 and the inner pad 7 are thus tilted in the opposite direction up to a point where the inner pad can be removed obliquely from the caliper 1. New pads are assembled in reverse chronological order. The inner pad is introduced into the caliper 1 in a tilted position, and the lug 25 is engaged into the locking receptacle 24 of the fixed support 4, and the caliper 1 is then turned down in an anti-clockwise direction, while the bearing nose 19 of the lining-holder plate 11 of the inner pad 7 is engaged on the guide edge 15 adjacent to the column 3. Subsequently, the inner pad is also turned down into its working position by making it pivot about the pivot axis of its lug 25 in a clockwise direction, while the caliper 1 continues to be turned down slightly in an anti-clockwise direction about the column 3. When the working position is reached, this position corresponding moreover to the connection by means of bracing of the caliper 1 to the fixed support 4 by means of the inner pad 7, the outer pad 6 is introduced into the caliper 1 and the two pads are locked by means of the key 20 and the pin or peg 21.

One of the essential advantages of the disc brake according to the present invention is the division of the transmission of the braking torque which is received, on the one hand, via the caliper 1 and the column 3 by the fixed support and, on the other hand, directly from the inner pad 7 by the locking receptacle 24 provided on said fixed support 4.

The embodiment described above will undergo certain modifications without departing from the scope of protection defined by the attached claims, and in particular the fixed support 4 can advantageously be produced directly on the stub-axle support of the vehicle and the brake then requires no other fixed support.

I claim:

1. A disc brake comprising a caliper mounted to slide parallel to the axis of the brake disc on a fixed support (4), inner and outer friction pads located in the caliper on either side of the disc and mounted to slide parallel to said axis, a rectangular assembly orifice delimited by two guide edges parallel to the axis of said disc and provided in the caliper to allow passage of active parts of the friction pads, each lining-holder plate of the pads having a bearing nose opposite a corresponding guide edge, a transverse key capable of being introduced between a guide edge of the caliper and corresponding bearing noses of the two plates to prevent any untimely radial movement of the pads, and a control motor mounted on an inner part of the caliper and capable of stressing the inner pad in the direction of the outer pad which bears against the caliper, characterized in that, the caliper (1) is mounted on the fixed support by means of a single column parallel to the axis of the brake disc, the linining-holder plate of the inner pad incorporates, under the guide edge remote from the column, a semi-circular pivoting lug and, under the guide edge adjacent the column a curved contour located within a circle the radius of which is equal to a distance between a pivot axis of said lug and a lower bearing ridge of the adjacent guide edge, and the fixed support having, underneath the guide edge (14) remote from the column, a semicylindrical locking receptacle the axis of which is parallel to the axis of the brake disc and which is open towards the guide edge adjacent the column and capable of receiving said pivoting lug, the transverse key being engaged above said locking receptacle between the corresponding guide edge and bearing noses of the two brake pads.

2. The disc brake according to claim 1, characterized in that the fixed support incorporates a notched plate which surrounds a lower part of the inner pad and which has two end horns penetrating into the caliper up to the vicinity of the guide edges and located next to the brake disc, one of the horns carrying the column and the other incorporating the locking receptacle.

3. The disc brake according to claim 1, characterized in that, in a locking position of the caliper and the inner pad, a distance between the pivot axis of the pivoting lug of said inner block and an upper ridge of the guide edge adjacent the column is slightly less than the distance separating the pivot axis of said lug and the lower bearing ridge of said adjacent guide edge.

* * * * *